Feb. 22, 1944.  R. G. ATKINSON  2,342,109
CONTAINER BODY
Filed March 24, 1942
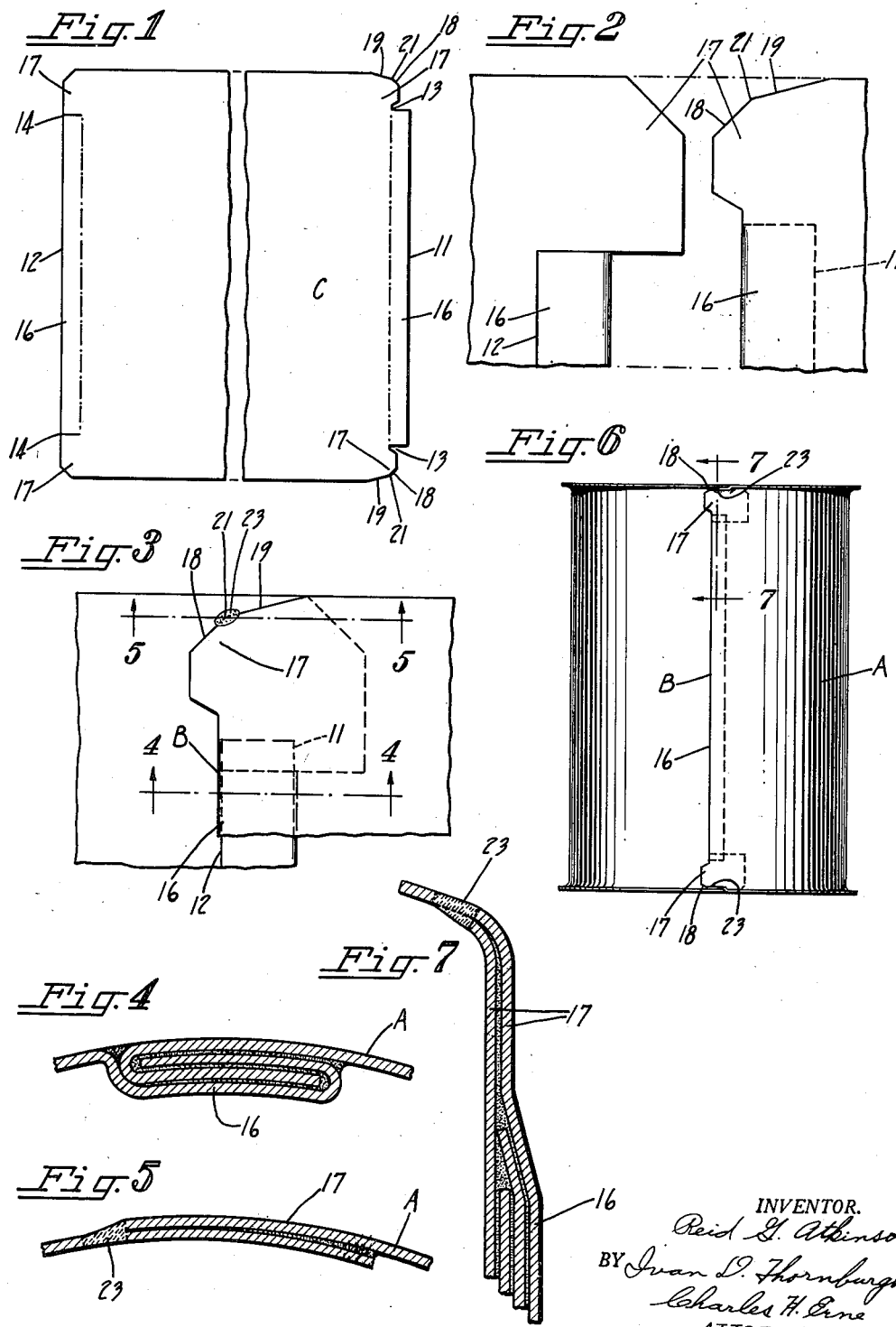
INVENTOR.
Reid G. Atkinson
BY Ivan D. Thornburgh
Charles H. Erne
ATTORNEYS Patented Feb. 22, 1944

2,342,109

UNITED STATES PATENT OFFICE 2,342,109

CONTAINER BODY

Reid G. Atkinson, Honolulu, Territory of Hawaii, assignor to American Can Company, New York, N. Y., a corporation of New Jersey Application March 24, 1942, Serial No. 436,039

3 Claims. (Cl. 220—75)

The invention relates to sheet metal cans or containers adapted to be vacuumized and has particular reference to a lapped end portion of the lock and lap side seam of a can body in which the laps are secured by solder and by an electric weld disposed in a predetermined location which controls the quantity of solder applied to the joint to maintain the latter vacuum tight after the body has been assembled with an end to form a can. This is an improvement over United States Patent 1,542,662, issued June 16, 1925, to Julius Brenzinger.

In the manufacture of can bodies which are adapted for certain uses and which have lock and lap side seams it has been the practice to spot weld the lap portions of the seam to hold them in position. When the can is to be vacuumized the laps usually are soldered after welding to fill the space between the laps to produce a hermetic joint. In such a joint it has been found that the spot weld holds the laps together so tightly in metal to metal contact that when the solder is applied to the laps it does not flow up to meet the weld and thus does not completely fill the space. Oftentimes this condition results in an open ring or channel around the weld spot which channel sometimes is large enough to establish an opening through the joint from the outside of the can to its interior. This channel as a rule is very small but is sufficient to permit of a slow leak which destroys the vacuum in the can and results in spoilage of its contents. In cans not vacuumized, as in the Brenzinger patent mentioned above, the interior and exterior pressures are more nearly equal, therefore there is not the same tendency for air to enter through the small channel.

Furthermore it has been found that the weld spot often permits only a very thin layer (approximately 0.001 inch) of solder to enter between the laps and this when cooled becomes brittle. Hence when the body is bent to form the usual flanges and end seams, the solder bond is broken and this in effect produces a condition similar to the channel above mentioned.

It has been determined that when a layer of solder approximately three one thousandths of an inch thick is interposed between the laps, the body of solder is malleable or pliant enough to permit of bending the joint without cracking or breaking the solder. In order to obtain this desired layer of solder the laps must be held apart the proper distance during the soldering operation to permit the solder to flow into place between them.

The instant invention contemplates overcoming these difficulties by making the weld spot of an elliptical shape and of as small an area as possible and by locating it in a predetermined position at an outer edge of the laps so that its holding effect will be just sufficient to keep the laps together at one point while allowing a predetermined quantity of solder to enter between the laps throughout the entire remaining area of the joint so that it will be completely sealed.

By clipping the corner edges of the lapped portions of the body the proper location of the weld spot is facilitated. For best results it is desirable to locate the spot weld inwardly of the body edge to prevent extruding of the metal which extrusion forms burrs that cut through the end seams and form leaks. It is also desirable to locate the weld outwardly of the flange bend so that the weld will be free of the bend.

An object of the invention is the provision of a can body having a lock and lap side seam with lap portions having angularly clipped corners forming an apex near the outer edge of the body and which are spot welded at the apex to secure such lapped sections together in a predetermined relation so that molten solder in a layer of predetermined thickness may be flowed therebetween and thus produce a hermetic joint which will readily withstand bending strains.

Another object of the invention is the provision of such a can body having spot welded lapped portions that are sealed with a layer of solder of a thickness sufficient to produce a malleable or pliant connection between the laps and which will permit bending of one lap upon the other during the flanging and seaming of the can body while maintaining a hermetic leak-proof joint.

Numerous other objects and advantages of the invention will be apparent as it is better understood from the following description, which, taken in connection with the accompanying drawing, discloses a preferred embodiment thereof.

Referring to the drawing:

Figure 1 is a plan view of a body blank from which a can body embodying the present invention is adapted to be made, with a portion of the blank broken away;

Fig. 2 is an enlarged fragmentary view of the side seam edges of the body blank prior to being formed into a body side seam;

Fig. 3 is a fragmentary view similar to Fig. 2 and showing the same side seam edges after being formed into the body side seam;

Figs. 4 and 5 are sectional views taken along the lines 4—4, 5—5 in Fig. 3, with parts broken away;

Fig. 6 is a side elevation of a flanged can body made from the blank shown in Fig. 1; and Fig. 7 is an enlarged sectional view taken substantially along the line 7—7 in Fig. 6.

As a preferred embodiment of the instant invention the drawing illustrates a sheet metal can body A (Fig. 6) having a conventional lock and lap side seam B. Such a can body is made preferably from a flat blank C (Fig. 1) having side seam edges 11, 12 formed with respective notches 13 and slits 14 in the usual manner. These notches and slits set off along a major portion of each seam edge a folded hook or lock section 16 and a pair of lap sections 17 located one adjacent each terminal end of the lock section (see also Fig. 2).

The lap sections 17 along the seam edge 11 preferably are cut back or clipped along an angular line of severance so that this clipped edge will be spaced inwardly of the outer edge of the blank. The drawing shows this clipped edge being formed by two angularly disposed intersecting edges 18, 19 which provide a corner or apex 21 spaced inwardly from both adjacent edges of the blank.

When the blank C is formed into tubular can body shape its side seam edges 11, 12 are brought together and are secured in the usual manner by an interlocking of the hook sections 16. It is this interlocking of the edges that produces the lock portion of the seam. The lap sections 17 merely overlap each other as unseamed portions as best shown in Fig. 3 with the clipped lap section disposed on the outside of the body.

The lap or unseamed sections 17 are secured together by an electric spot weld 23. This weld is preferably located at the corner or apex 21. The weld spot preferably is made relatively small in area and of substantially elliptical shape so that it extends along the clipped edges 18, 19 of the outer lap section and spreads over the edge of the outer lap and onto the under lap. In this position of the weld it is spaced inwardly of the peripheral edge of the can body so that the metal of the body is prevented from being extruded beyond the body edge. This position of the weld also tacks down only the outer edge of the outer lap 17 and thus holds this lap lightly so it will spring away from the inner lap and provide a predetermined space therebetween.

It may be mentioned that the desired small elliptical weld spot may be produced by the use of properly spaced electrodes and by the relative positioning of the two electrodes.

The can under consideration is particularly adapted for vacuumized products and for this reason the entire side seam is soldered in order to make the joint hermetic. Some of this solder flows into the space between the inner and outer laps 17 and it is this solder that bonds the laps together and that seals the joint up to the weld as hereinbefore mentioned.

Due to the location of the spot weld the space between the laps 17 is just sufficient to admit a layer of solder that extends over the entire lapped area and which is of a thickness sufficient to impart malleable or pliant properties to the solder so that when the body is bent during the flanging and end seaming operations the bending strains on the solder will take place throughout its thickness and not on its surface where it is bonded to the laps of the body. It is this proper thickness of solder that maintains its continuity during the bending operations and which maintains the seal and leak-proof characteristics of the joint.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A tubular body for a can adapted to be vacuumized, said body having a side seam extending the major intermediate portion of its length and having unseamed portions at its opposite ends formed by overlapping edges, the outer of said unseamed portions at each end of said body having an angularly clipped corner spaced inwardly from the end of the body, and a spot weld of relatively small area substantially straddling the apex of said corner for holding said unseamed portions together in predetermined spaced relation, the space between said overlapped unseamed portions being filled and sealed with solder of sufficient thickness and area to provide a hermetic pliant bond so that the body may be flanged and seamed without affecting the hermetic character of the joint.

2. A tubular can body having a side seam extending the major intermediate portion of its length and having unseamed portions at its opposite ends formed by overlapping edges, the outer of said unseamed portions at each end of said body having an angularly clipped corner spaced inwardly from the end of the body, and an elliptical spot weld straddling the apex of said clipped corner and extending partially along said clipped edges and covering a relatively small area in said unseamed portions for holding such portions together in predetermined spaced relation, said side seam being filled and sealed with solder throughout its length, the solder between the overlapped unseamed portions adjacent the weld being of sufficient thickness and area to provide a hermetic pliant bond so that the body may be flanged and seamed without detracting from the hermetic character of the joint.

3. A can body having a side seam extending for the major intermediate portion of its length and having unseamed portions at its opposite ends formed by overlapping edges, the outer of said unseamed portions at each end of said body having an angularly clipped corner formed by the intersection of two angular edges providing an apex spaced inwardly from the end of the body, an elliptical spot weld straddling said apex inwardly of the adjacent can end and extending partially along the two clipped edges to cover a relatively small area in said unseamed portions for holding such portions together in predetermined spaced relation, said side seam being filled and sealed with solder throughout its length, the solder between the lapped unseamed portions adjacent the weld being of sufficient thickness and area to provide a hermetic pliant bond so that the body may be flanged and seamed while maintaining the hermetic character of its joint.

REID G. ATKINSON.